United States Patent [19]
Oda

[11] Patent Number: 5,185,121
[45] Date of Patent: Feb. 9, 1993

[54] REACTOR POWER MEASURING METHOD

[75] Inventor: Minoru Oda, Kobe, Japan

[73] Assignee: Mitsubishi Denki Kabushiki Kaisha, Tokyo, Japan

[21] Appl. No.: 821,871

[22] Filed: Jan. 16, 1992

Related U.S. Application Data

[63] Continuation of Ser. No. 595,745, Oct. 10, 1990, abandoned, which is a continuation of Ser. No. 355,808, May 22, 1989, abandoned, which is a continuation of Ser. No. 765, Jan. 6, 1987, abandoned.

[30] Foreign Application Priority Data

Jan. 29, 1986 [JP] Japan .................................. 61-15883

[51] Int. Cl.$^5$ .............................................. G21C 17/00
[52] U.S. Cl. ................................................... 376/254
[58] Field of Search ............................... 376/254, 255

[56] References Cited

U.S. PATENT DOCUMENTS

| | | | |
|---|---|---|---|
| 4,069,097 | 1/1978 | Frank | 376/254 |
| 4,079,236 | 3/1978 | Graham et al. | 364/504 |
| 4,568,514 | 7/1986 | Lingren et al. | 376/255 |

FOREIGN PATENT DOCUMENTS 2515712 10/1976 Fed. Rep. of Germany ...... 376/254
52-107496 9/1977 Japan .

OTHER PUBLICATIONS

*Lectures On Fast Reactors*, 1978, by Karl Wirtz, available from ANS, La Grange Park, Ill., pp. 291-295.

Primary Examiner—Harvey E. Behrend
Attorney, Agent, or Firm—Leydig, Voit & Mayer

[57] ABSTRACT

In a nuclear reactor wherein a plurality of neutron detectors are arranged vertically and at equal azimuth angles around a core of the nuclear reactor, thereby to measure a vertical power profile with a core of the reactor core, the improvement comprising dividing the core into sectors at respective azimuth angles confronting the neutron detectors, usingg the output signal of the partial detectors included in each of the neutron detectors for measuring a vertical reactor power profile of the azimuthal sector of the core confronting the corresponding neutron detector, and averaging the vertical profiles of the respective azimuthal parts with respect to the azimuth angles to measure the vertical reactor power profile of the reactor.

4 Claims, 1 Drawing Sheet

REACTOR POWER MEASURING METHOD

This application is a continuation of application Ser. No. 07/595,745, filed on Oct. 10, 1990, which is a continuation of prior application Ser. No. 07/355,808, filed on May 22, 1989 which is a continuation of prior application Ser. No. 07/000,765, filed on Jan. 6, 1987, all now abandoned.

BACKGROUND OF THE INVENTION

This invention relates to a reactor power measuring method. More particularly, it relates to a reactor power measuring method for measuring the power distribution in the core of a nuclear reactor by the use of neutron detectors.

An in-core power profile of a nuclear reactor provides information important for operating the nuclear reactor, and several methods for measuring it have heretofore been tried. One of them is a method wherein a large number of stationary-type small-sized neutron detectors are installed in the nuclear reactor. With this method, replacement of a detector due to a malfunction thereof is difficult, and hence, the detector is required to operate properly for a long term. However, it has been very difficult to fabricate such a detector. The second method is a method wherein small-sized neutron detectors are successively inserted into a large number of detector insertion holes provided in the nuclear reactor, thereby to measure the reactor power profile while the nuclear reactor is being scanned. This method has the disadvantage that a long time is required for measuring the reactor power profile over the whole nuclear reactor and, accordingly, that reactor power profiles which change in a short time cannot be followed. The third method is a method wherein the detectors of a neutron measurement device are installed outside the reactor. This device has hitherto been used for measuring the reactor power of a pressurized water reactor (PWR) and is divided in the axial directions thereof into a large number of shorter detectors, the output signals of which are utilized to calculate the reactor power profile.

The third method mentioned above will now be explained with reference to FIG. 2. In the figure, numeral 100 designates the core of the PWR, which is divided into parts 101–104 in the axial direction thereof. Numerals 210, 220, 230 and 240 indicate neutron detectors, respectively. Numerals 211–214, 221–224, 231–234 and 241–244 indicate divided partial detectors of the neutron detectors 210, 220, 230 and 240, respectively.

Though not shown, the scanning type neutron detectors within the core as explained in connection with the second method mentioned above are disposed in the reactor core, so that the in-core power profile f(x, y, z) of the nuclear reactor is obtained. The device illustrated in FIG. 2 serves to find the mean value f(z) (the power profile in the vertical direction) of the reactor power profile f(x, y, z) for given xy-planes (horizontal planes).

$$f(z) = \frac{1}{S_{xy}} \int_{S_{xy}} f(x, y, z) \, dx \, dy \quad (1)$$

($S_{xy}$: horizontal sectional area of the core)
Here, f(z) can be expressed as the summation of a Fourier series by the following:

$$f(z) = \sum_{i=1}^{i_{max}} C_i \sin i \pi Z/Z_{max} \quad (2)$$

(where $Z_{max}$: height of the core)
In this regard, since the reactor power profile decreases at the upper and lower ends of the core, the equation is expressed by a sine series having a domain of $0 - \pi$. The coefficient $C_i$ is evaluated from the axial power profile f(z), and an equation for evaluating $C_i$ from f(z) is the so-called Fourier series expansion, which is given by the following equation:

$$C_i = \int_0^{Z_{max}} f(z) \sin i\pi \frac{Z}{Z_{max}} \, dz \quad (3)$$

Here, in this device, the above coefficient needs to be determined from the output signal values of the partial detectors 211–214, etc. It is therefore convenient to use the following equation instead of Eq. (3):

$$[C_i] = [A_{ij}][f_j] \quad (4)$$

where $$\begin{cases} f_j = \int_{Z_{Bj}}^{Z_{Tj}} f(z) \, dz \\ z_{Tj} \colon \text{upper end of the } i\text{-th core part} \\ z_{Bj} \colon \text{lower end of the } i\text{-th core part} \end{cases}$$

$[A_{ij}]$ denotes a constant coefficient matrix, which is obtained by solving Eq. (2) integrated over the respective sections i. The quantity $f_j$ is obtained in such a way that f(z) is integrated in the direction of a Z-axis for the respective reactor parts 101–104. It has the relation of the following equation to the outputs of the partial detectors 211–214, etc.

$$[D_k] = [Q_{kj}][f_j] \quad (5)$$

Here, $D_k$ is defined to be $D_1$ for the mean value of the outputs of the partial detectors 211, 221, 231 and 241; to be $D_2$ for the mean value of the outputs of the partial detectors 212, 222, 232 and 242; and so on. $[Q_{kj}]$ denotes a constant coefficient matrix whose coefficients are the rates of contribution of the powers of the respective parts of the core to the corresponding partial detectors.

From Eqs. (4) and (5), the Fourier coefficient $C_i$ is obtained as follows.

$$[c_i] = [A_{ij}][Q_{kj}]^{-1}[D_k] \quad (6)$$

Further, the power profile f(z) in the axial direction of the core is evaluated in accordance with Eq. (2).

With the reactor power measuring method of the prior art as thus far described, for the purpose of determining the constant coefficient matrix $[Q_{kj}]$ of Eq. (5), a plurality of sets of the detector outputs $[D_k]$ and the integral values $f_j$ of the powers of the reactor parts need to be prepared for determining different reactor power profiles. The number of the sets must be, at least, the number of divisions (four in FIG. 2) of the partial detectors. Another problem is that, unless the reactor power profiles of the respective sets are sufficiently different, the calculation of the matrix $[Q_{kj}]$ becomes difficult.

SUMMARY OF THE INVENTION

This invention is intended to eliminate such problems, and has for its object to provide a reactor power measuring method which can facilitate the determination of the transformation matrix $[Q_{kj}]$, can enhance the precision of the calculation of a reactor power profile and can make the reactor power profile more detailed.

In the reactor power measuring method according to this invention, the correspondence between $f_j$ and $[D_k]$ is not found in obtaining the transformation matrix $[Q_{kj}]$. Instead, only in-core information items within azimuthal sections lying in front of respective neutron detectors are utilized for the preparation of the transformation matrix.

In this invention, accordingly, the correlation of sets of data for obtaining the transformation matrix $[Q_{kj}]$ increases, and the calculation of $[Q_{kj}]$ is facilitated. Moreover, since the axial reactor power profile of the azimuthal region confronting each neutron detector is obtained, the reactor power profile information can be more detailed.

BRIEF DESCRIPTION OF THE DRAWINGS

FIG. 1 is a perspective view showing the arrangement of detectors and a reactor core for explaining an embodiment of this invention, while

In the drawings, the same symbols indicate identical or corresponding portions.

DESCRIPTION OF THE PREFERRED EMBODIMENT

Figure 1:
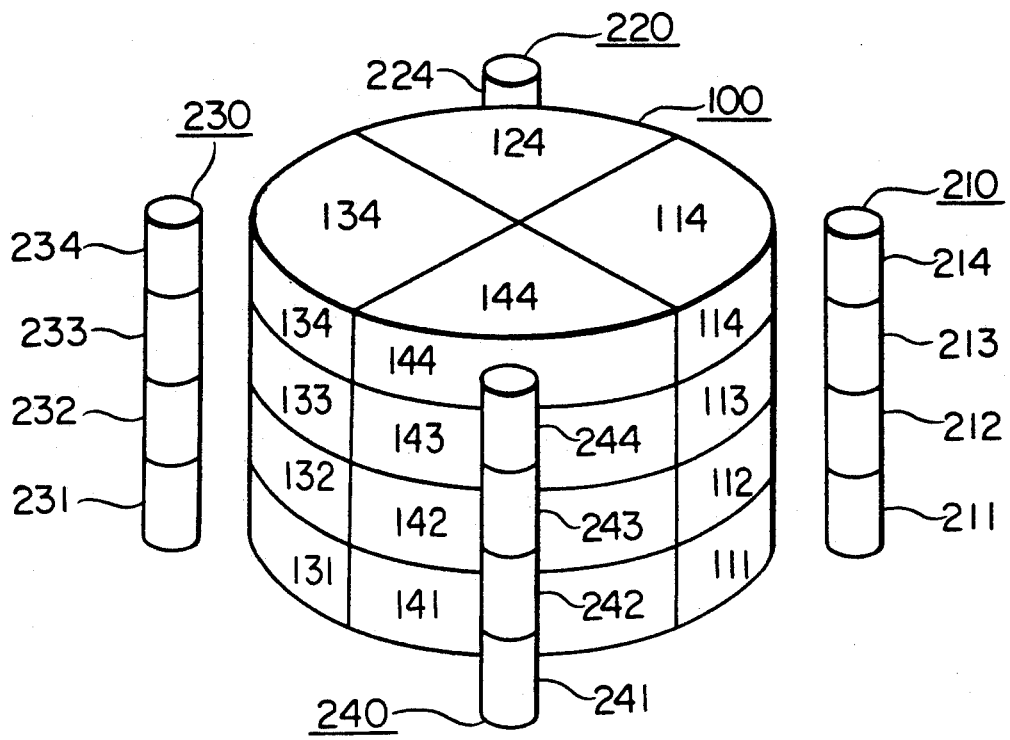
Figure 2:
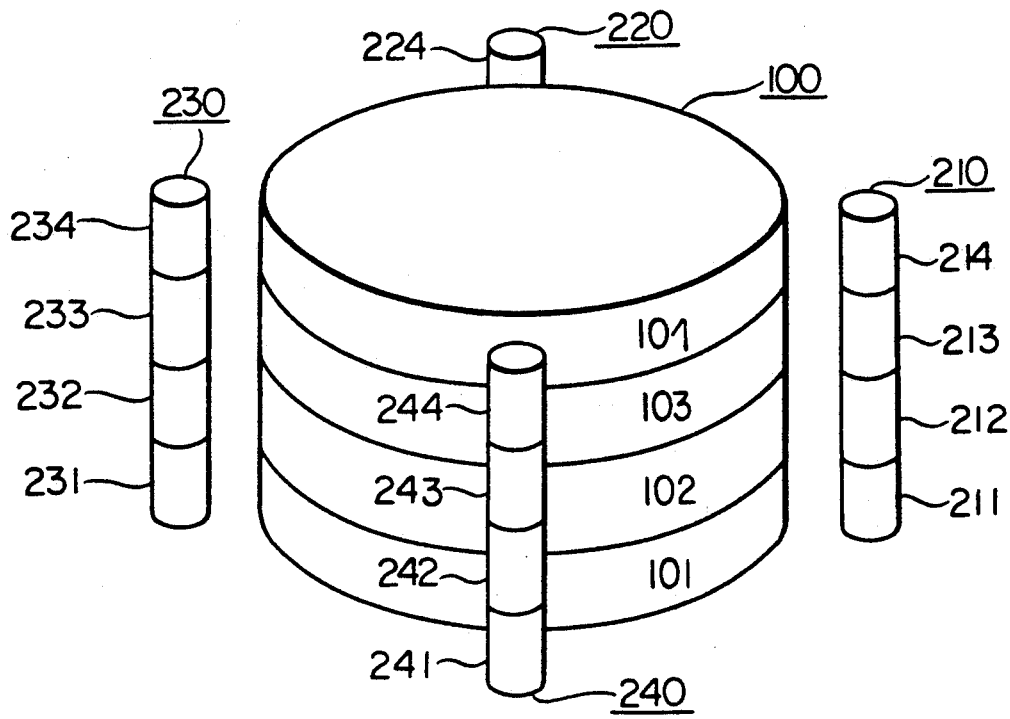
FIG. 2 is a perspective view showing the arrangement of detectors and a reactor core for explaining a reactor power measuring method in a prior art.

Now, an embodiment of this invention will be described with reference to FIG. 1. Here, a point of difference from the prior art illustrated in FIG. 2 is that the core of the nuclear reactor is divided in azimuthal directions into sixteen core parts 111–114, 121–124, . . . , whereupon these parts are respectively analyzed. A difference in the procedure of the analysis is that, to obtain the transformation matrix $[Q_{kj}]$ in Eq. (5), the integrals of the powers of the reactor parts in the $\frac{1}{4}$ azimuthal part confronting each detector are used instead of the integral value $f_j$ of the powers of the reactor parts. More specifically, Eq. (5) is composed of the following four equations where $D_{1k}$–$D_{4k}$ denote the partial detector outputs of the four detectors 210, 220, 230 and 240 indicated by $D_1$–$D_4$, respectively, and where $f_{1j}$ denotes the partial power integral value of the core parts 111–114, $f_{2j}$ denotes the partial power integral value of the core parts 121–124, and so on:

$$[D_{1k}] = [Q_{1kj}][f_{1j}] \quad (5\text{-}1)$$

$$[D_{2k}] = [Q_{2kj}][f_{2j}] \quad (5\text{-}2)$$

$$[D_{3k}] = [Q_{3kj}][f_{3j}] \quad (5\text{-}3)$$

$$[D_{4k}] = [Q_{4kj}][f_{4j}] \quad (5\text{-}4)$$

These equations can be expressed in a more generalized form as:

$$[D_{mk}] = [Q_{mkj}][f_{mj}]$$

Four transformation matrices $[Q_{1kj}]$–$[Q_{4kj}]$ are found for the respective equations (5-1)–(5-4), and the Fourier coefficients $C_i$ obtained by substituting the respective matrices into Eq. (6) are denoted by $C_{1i}$–$C_{4i}$. The reactor power profiles obtained by substituting the respective coefficients $C_{1i}$–$C_{4i}$ into Eq. (2) are the axial reactor power profiles of the $\frac{1}{4}$ azimuthal core parts confronting the corresponding detectors 210–240. Letting these axial profiles be $f_1(z)$–$f_4(z)$, the mean value $f(z)$ is found from the following equation, and the final result $f(z)$ which is similar in form to that of the prior art is obtained:

$$f(z) = \frac{1}{4} \sum_{l=1}^{4} f_l(z) \quad (7)$$

Next, there will be the explained advantages which are attained by the alteration of the analytical procedure as stated above. In the prior art, the precision of the calculated reactor power profile is determined by the numerical precision of the transformation matrix $[Q_{kj}]$ of Eq. (5), and it has been difficult to obtain a highly precise $[Q_{kj}]$ from the sets of $[D_k]$ and $[f_j]$ based on limited measurements. Here, the relationships between the powers of the individual parts, i.e., sectoral columns which are generalized as m such columns hereinafter, of the reactor core and the output signal values of the corresponding partial detectors, hereinafter generalized as the $j^{th}$ partial detector of the $k^{th}$ detector, will be considered. The output signal value closely correlates to the power of the core part near the detector a horizontal plane, but the correlation decreases abruptly as the detector moves away from the core part in the horizontal direction. This tendency is especially marked in a thermal reactor because the mean free path of neutrons is short. Accordingly, when the mean values of the detector output and the core power are both taken in the horizontal plane and compared as in Eq. (5), the components thereof contributed by remote core parts are involved in the comparison, and the correlation is poor. In contrast, according to the procedure of this invention, only the powers of the core parts close to the respective detectors expressed by Eqs. (5-1)–(5-2), instead of Eq. (5), are considered. Therefore, the correlation between $[D_{mk}]$ and $[f_{mj}]$ (m=1–4) is high in each equation, the calculation for finding the transformation matrix $[Q_{mkj}]$ is facilitated, and the precision is enhanced. Besides, owing to Eq. (7), not only the same result as in the prior-art method is obtained, but also the axial reactor power profiles $f_m(z)$ (m=1–4) for the four azimuth angles are respectively obtained as interim results, whereby a reactor power profile more detailed than that of the prior-art method is obtained.

Although, in the description of the embodiment, the reactor power profile has been expressed by the Fourier series of Eq. (2), the series type usable for the expansion is not restricted to the Fourier series. Another orthogonal function series such as Hermite polynominals can also be effectively utilized.

As understood from the above, according to this invention, in finding a transformation matrix for use in the calculation of a reactor power profile, the mean value of only the divided azimuth part of a reactor core near a detector is used instead of a mean value within the horizontal plane of the core, so that the correlation between a detector output and the reactor power profile is improved, the calculation of the transformation matrix is facilitated, and an enhanced measurement precision is attained. Another effect is that, since the axial reactor power profiles of respective azimuth angles are obtained as interim results, the reactor power profile is known in more detail.

What is claimed is:

1. In a nuclear reactor wherein a plurality of neutron detectors are arranged vertically and at equal azimuth angles around a core of the nuclear reactor, each of the neutron detectors having a length substantially equal to the height of the core and including therein a plurality of partial detectors having lengths equal to one another, a method for measuring a vertical power profile of sectors of the reactor core comprising:

dividing said core into a m sectoral columns, where m is greater than two, the sectoral columns forming respective azimuth angles, each sectoral column facing a respective neutron detector k;

dividing each sectoral column m into j azimuthal parts, each azimuthal part facing a respective partial detector;

calculating a vertical reactor power profile $a_{mj}$ for each sectoral column m including establishing a transformation matrix in accordance with $$[D_{mk}] = [Q_{mkj}][f_{mj}]$$

wherein $D_{mk}$ are the outputs of the partial detectors of the detector k and $f_{mj}$ are the integrated power outputs of the azimuthal parts j of the sectoral column m facing said detector k;

calculating the Fourier coefficients $C_{mj}$ for each azimuthal part j of each sectoral column m of said core from $$[C_{mj}] = [A_{mk}][Q_{mkj}]^{-1}[D_{mk}]; \text{ and}$$

calculating the reactor power profiles $f_{mz}$ of each sectoral column m from $$f_{mz} = \sum_{j=1}^{jmax} C_{mj} \sin(j\pi Z_j/Z_{max})$$

where $Z_j$ is the thickness of the $J^{th}$ azimuthal part and $Z_{max}$ is the total axial thickness of said core to measure the vertical reactor power profile of each of the sectoral columns of said core.

2. A method for measuring a vertical reactor power profile of a reactor core comprising the steps of:

arranging k neutron detectors, where k is greater than two, at predetermined azimuthal angles around the outside of a reactor core, thereby defining m sectoral columns of the reactor core where m is greater than two;

dividing each neutron detector along its axis into j partial detectors, where j is greater than two, thereby defining azimuthal parts j of each sectoral column k of the reactor core which respectively correspond to the partial detectors of the corresponding detector;

calculating a separate vertical reactor power profile for each sectoral column of the reactor core including approximating the vertical reactor power profile of each sectoral column as a Fourier series expansion and generating the coefficients of the series expansion by establishing a transformation matrix in accordance with $$[D_{mk}] = [Q_{mkj}][f_{mj}]$$

wherein $D_{mk}$ are the outputs of the partial detectors of the detector k corresponding to the sectoral column m and $f_{mj}$ are the integrated power outputs of the azimuthal parts j of the sectoral column m facing the corresponding detector k;

calculating the Fourier coefficients $C_{mj}$ for each azimuthal part j of each sectoral column m of said core from the equation $$[C_{mj}] = [A_{mk}][Q_{mkj}]^{-1}[D_{mk}]; \text{ and}$$

calculating the reactor power profiles $f_{mz}$ of each sectoral column m from $$f_{mz} = \sum_{j=1}^{jmax} C_{mj} \sin(j\pi Z_j/Z_{max})$$

where $Z_j$ is the thickness of the $j^{th}$ azimuthal part and $Z_{max}$ is the total axial thickness of said core to measure the vertical reactor power profile of each of the sectoral columns of said core.

3. The method of claim 1 including averaging the reactor power profiles of the sectoral columns to measure the axial vertical reactor power profile of said core.

4. The method of claim 2 including averaging the reactor power profiles of the sectoral columns to measure the axial vertical reactor power profile of said core.

* * * * *

UNITED STATES PATENT AND TRADEMARK OFFICE
CERTIFICATE OF CORRECTION

PATENT NO. : 5,185,121

DATED : February 9, 1993

INVENTOR(S) : Minoru Oda

It is certified that error appears in the above-identified patent and that said Letters Patent is hereby corrected as shown below:

On title page,

Item no. [56], References Cited, change "4,568,514 7/1986 Lingren et al............376/255" to --4,568,514 2/1986 Lingren et al. ......376/255--.

Item no. [57], Abstract, line 7, change "usingg" to --using--.

Claim 1, col. 5, line 24, after "matrix" insert --[Qmkj]--.

Claim 1, col. 5, line 44, change "$J^{th}$" to --$j^{th}$--.

Claim 2, col. 6, line 18, after "matrix" insert --[Qmkj]--.

Signed and Sealed this

Sixteenth Day of November, 1993

Attest:

BRUCE LEHMAN

*Attesting Officer*  *Commissioner of Patents and Trademarks*